March 5, 1968  A. NORDKVIST ET AL  3,371,462
METHOD OF PACKING A NUMBER OF CONTAINERS IN ONE UNIT
Filed Dec. 10, 1964

INVENTORS
Allan Nordkvist &
Jack Nordqvist
BY
Mason, Porter, Diller & Stewart
ATTORNEYS United States Patent Office 3,371,462
Patented Mar. 5, 1968

3,371,462
METHOD OF PACKING A NUMBER OF CONTAINERS IN ONE UNIT
Allan Nordkvist and Jack Nordqvist, both of Surte, Sweden
Filed Dec. 10, 1964, Ser. No. 417,305
Claims priority, application Sweden, Dec. 10, 1963, 13,678/63
5 Claims. (Cl. 53—33)

ABSTRACT OF THE DISCLOSURE

Disclosed herein is a method of packing in one unit a number of containers including placing first and second foils of heat shrinkable material above and below the containers, folding the foils toward each other and welding the periphery of the foils together. The welded together peripheral portions of the foils are heat shrunk into force-exerting relationship to the outermost containers. The foils are further heat shrunk at selected locations therein to further insure that the containers are tightly maintained within the covering so formed.

Figure 1:
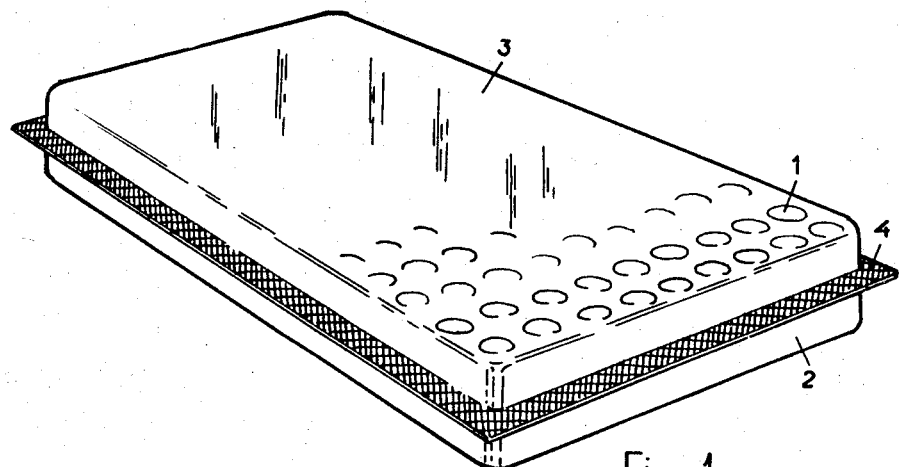

Further disclosed herein is the packaging unit formed in accordance with the above-outlined method.

The present invention relates to a method of packing in one unit a number of containers in the form of cans, bottles, boxes and the like, and then particularly to a method suitable for manufacturers of containers of said kinds. The containers contemplated are supplied from said manufacturers packed in large outer packings which are suitable for transport by conventional transportation means. Said outer packings then have dimensions which are adapted to conventionally used and standardized loading pallets. The outer packings can thus have the same cross-sectional area as said loading pallets, or a cross-sectional area which is a multiple of the load surface of said loading pallet. The outer packings which have hitherto been used have usually consisted of corrugated pasteboard cartons or paper sacks. These outer packings are bulky, and require large storage spaces as the premises at manufacturers' of containers of said kinds. Moreover, quite a number of packers are needed for the filling of said outer packings. With consideration to the fact that manufacturers of the above-mentioned containers thus must work with bulky packings and have little packing personnel, intensive development work has been carried on for a long time to simplify the packing of said containers with regard to the consumers who are to fill the containers. Hitherto, however, no one has succeeded in creating the desired simplification of the packing for said containers. The difficulty has presumably been that it is a desire that each outer packing should hold a very large quantity of containers, and that the outer packing should be adapted to said loading pallets.

It has been known for a long time to use plastic foils to enclose a few filled containers. The plastic foils are then shrunk onto said containers. Any attempts to essentially increase the number of containers have not been made, with consideration to the risk of breaking the outer packing. Certain attempts have been made to pack a rather large quantity of filled containers in a plastic foil which is therefter shrunk. At these attempts, for the previously mentioned reason, one has not dared to pack the containers only in a plastic foil which is shrunk, and the containers have been placed in a tray, and thereafter packed in a plastic foil.

The purpose of the present invention is to create a method which makes it possible to pack a large quantity of containers with the aid of plastic foil, the method then being such that the packing is not broken even if the unit formed is lifted by one end of the unit.

A method of packing in one unit a number of containers in the form of cans, bottles, boxes and the like, placed in such a way as to form a layer in which the containers are located beside each other, or several layers of said kind are located on top of each other, is chracterized according to the present invention in that the layer or layers placed on top of each other are enclosed in two foils of plastic or a similar material which have the property of shrinking when heat is applied to them. One of the foils is placed over the top of the layer or layers and the other foil is placed under the bottom of the layer or layers. The two foils have such dimensions that they can be folded down and folded up, respectively, along the side or sides of the layer or layers, respectively, in such a way that the edges of the two foils can be joined together by means of welding, approximately half way between the top and the bottom of the layer or layers. The two foils enclose said containers so that they are located as close to each other as possible. The weld seam is heated and thereby will function as a peripheral bandage for the containers and this bandage is reinforced with an encircling band with a width of up to the height of the layer or layers, which band is formed of said foil and is heated. The part of the foil which forms the bottom of the packing is heated partly or entirely, so that a shrinking takes place, and the part of the foil which forms the top of the packing is heated partly, preferably at its center, so that a shrinking takes place.

An advantageous design according to the invention is to have said band located at the bottom of the packing.

Heating of the bottom of the packing can take place along a peripheral sector of its surface.

An appropriate material for the method is polyethylene, which should have a thickness of not more than 0.1 mm. and preferably not less than 0.05 mm.

The previously mentioned peripheral sector should preferably have a width corresponding to ¾ of the height of the packing.

Figure 2:
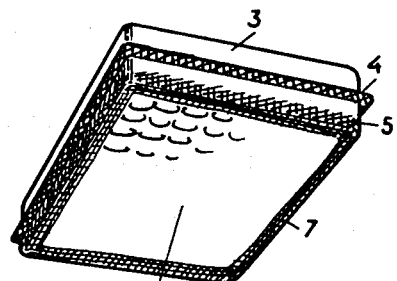

The present invention will be described in more detail in conjunction with the attached drawing in which, FIG. 1 shows an outer packing made of foil, which encloses a large number of containers, which packing has not been subjected to shrinking, FIG. 2 shows the same packing, with indications of the surfaces which are to be subjected to heat-treatment, so that a shrinking of the foil is obtained.

Figure 3:
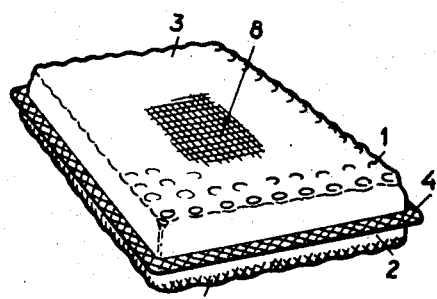
Figures 4, 5:
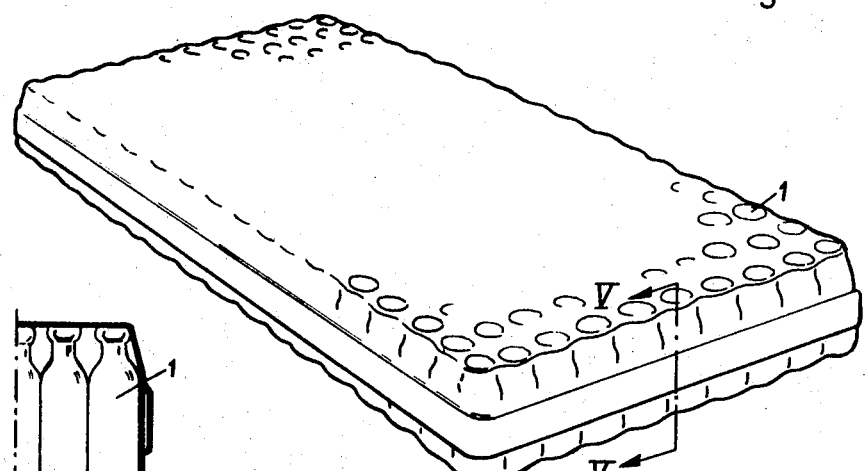

FIG. 3 shows the shrunk packing according to FIG. 2, with an indication of further heat-treatment of a certain surface, FIG. 4 shows the finished packing for the containers and FIG. 5 is a cross-section of the packing according to FIG. 4.

The method according to the invention is carried out in such a way that a quantity of containers 1, which in the present exemplary case consists of a number of bottles, is arranged by means of some appropriate device, so that they are located closely beside each other and form a mainly parallelepipedical unit. Said unit is moved in such a way that it will be placed on a rectangular plastic foil 2, which preferably can be made of polyethylene and have a thickness of between 0.05 and 0.1 mm. The plastic foil has a circumference which is greater than the circumference of the parallelepiped which is formed by the containers 1. The protruding parts of the spread out plastic foil will form a frame around the parallelpipedical unit. An identical foil 3 is placed on top of the paralleopipedical unit in such a way that the two foils 2 and 3 cover each other entirely. The foil 2 is folded up along the sides of the unit and the foil 3 is folded down along the sides of the unit in such a way that said foil parts will be as closely in contact with the sides of the unit as possible. The excessive parts of the edges of the two foils 2 and 3 are folded over so that a flange 4 is obtained, which goes around the parallelepipedical unit and which will be located between the top and bottom of the unit. It is then appropriate to allow the flange to be located halfway between said top and bottom. The edge surfaces which form the flange 4 are joined together by welding. In FIG. 1, the flange 4 has been indicated in a special way. The welded flange is subjected to a heat-treatment, e.g. through hot air from a nozzle, so that the material in the flange is caused to shrink to such a degree that a peripheral bandage or binding is obtained, which has sufficient strength to hold the enclosed containers 1 together. Such holding together results, of course, from the force exerted inwardly by said bandage.

In order to reinforce the above-mentioned bandage, which is formed by the flange 4, a peripheral sector of the parts of the foil which form the sides of the packing can be subjected to shrinking. Said parts of the foil have the character of a peripheral band 5, running from the bottom of the packing. Said band 5 is achieved by spraying the surface of the band which is formed with hot air. The band can have a width which amounts to ¾ of the height of the packing. The bottom or bottom panel portion 6 of the packing is also subjected to a heat-treatment, so that parts of the bottom are shrunk. According to the present invention, it is particularly appropriate that only a surface 7 in the form of a peripheral sector is subjected to shrinking in the above-mentioned way. In addition to said shrinking, it can be appropriate, in certain cases, to subject a surface in the center of the bottom to shrinking.

The part of the packing which is located above the flange 4 is subjected to shrinking only within the part 8 of the upper surface or top panel portion which is indicated in FIG. 3. The heat-treatment is then chosen in such a way that only said part of the packing is shrunk to such an extent that there are no slack parts.

FIG. 5 shows a cross-section of an outer packing of which the shrinking has been completed. From this it will be noted how well the bottles are held together.

It is advisable, as shown in FIG. 4, to fold down the flange 4.

It should be obvious that, without departing from the concept of the invention, it is possible to enclose several layers of containers in the outer packing. It should also be obvious that the containers need not be arranged in such a way that the outer packing obtains a parallelepipedical from, but the containers can be arranged in any arbitrary way whatsoever. Thus, they can form cylindrical units.

Extensive practical trials have shown that, according to the invention, packing units can be formed which contain 88 glass jars, which are used for Findus Baby Food. These packing units can be stacked on loading pallets and transported on trucks, and this does not involve any risks.

We claim:

1. The method of packing in one unit a number of containers such as cans, bottles, boxes and the like, comprising placing the containers beside each other to form at least one layer of such containers, placing a first foil of heat shrinkable material atop the at least one layer and placing a second similar foil under the at least one layer, folding the first and second foils downwardly and upwardly respectively along the sides of the at least one layer, folding the foils outwardly along the sides of the layer, welding the outwardly folded portions of the foils together to form a weld seam approximately half way between the top and bottom of the containers, locally heating the weld seam to shrink the outwardly folded foil portions inwardly to form a peripheral, encircling bandage about the layer, locally heating a portion of the foils adjacent the sides of the layer to form a layer encircling band in firm engagement with the sides of the layer, heating a portion of the second foil adjacent the bottom of the layer to shrink the second foil, and heating a portion of the first foil adjacent the top of the layer to shrink the first foil.

2. The method of packing in one unit a number of containers such as cans, bottles, boxes and the like, comprising placing a number of containers in side-by-side relationship to form at least one layer of containers, placing first and second heat shrinkable foils atop and under the containers respectively, folding the foils toward each other adjacent the sides of the outermost containers, folding the foils outwardly and welding the outwardly folded portions of the foils together to form an outwardly extending encircling flange, and contracting the flange into inward force exerting relationship with the outermost containers, said step of contracting including heating the welded flange to shrink the flange inwardly to form a tightly fitting encircling bandage about the containers.

3. The method according to claim 2 further including the step of heat treating a portion of at least one of the first and second foils adjacent the sides of the outermost containers to shrink that portion into close fitting engagement with the outermost containers.

4. The method according to claim 3 further including the step of heating a portion of at least one of the first and second foils adjacent one of the faces defined by the containers to shrink that foil.

5. The method of packing in one unit a number of containers such as cans, bottles, boxes or the like, comprising placing a number of containers in side-by-side relationship, placing a first heat shrinkable foil over and a second heat shrinkable foil under the containers, folding the foils toward each other adjacent the outwardly facing sides of the outermost containers, folding the foil edges outwardly and welding the outwardly folded edges together about the entire periphery of the foils to form an encircling flange and to substantially totally enclose the containers, and locally heat shrinking the flange inwardly into firm force exerting engagement with the containers.

References Cited

UNITED STATES PATENTS

| 3,133,387 | 5/1964 | Harrison | 53—30 |
|---|---|---|---|
| 3,188,215 | 6/1965 | Snow. | |
| 3,190,050 | 6/1965 | Kirkpatrick | 53—30 |
| 3,198,683 | 8/1965 | Lee | 53—373 |
| 3,200,562 | 8/1965 | Zebarth et al. | 53—84 |

FOREIGN PATENTS

| 1,368,936 | 6/1964 | France. |
|---|---|---|
| 1,369,443 | 7/1964 | France. |

WILLIAM W. DYER, Jr., *Primary Examiner.*

FRANK E. BAILEY, ROBERT C. RIORDON,

*Examiners.*

N. ABRAMS, *Assistant Examiner.*